(12) United States Patent
Khalil et al.

(10) Patent No.: US 7,218,634 B1
(45) Date of Patent: May 15, 2007

(54) ASSISTED POWER-UP AND HAND-OFF SYSTEM AND METHOD

(75) Inventors: Mohamed Khalil, Murphy, TX (US);
Haseeb Akhtar, Garland, TX (US);
Krishnakumar Pillai, Dallas, TX (US);
Emad A. Qaddoura, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 984 days.

(21) Appl. No.: 09/973,299

(22) Filed: Oct. 9, 2001

Related U.S. Application Data

(60) Provisional application No. 60/238,899, filed on Oct. 10, 2000.

(51) Int. Cl.
*H04L 12/28* (2006.01)

(52) U.S. Cl. .................. 370/392; 370/401

(58) Field of Classification Search ............... None
See application file for complete search history.

(56) References Cited

U.S. PATENT DOCUMENTS

| | | | |
|---|---|---|---|
| 6,434,134 B1 * | 8/2002 | La Porta et al. | 370/338 |
| 6,445,922 B1 * | 9/2002 | Hiller et al. | 455/433 |
| 6,535,493 B1 * | 3/2003 | Lee et al. | 455/432.2 |
| 6,549,522 B1 * | 4/2003 | Flynn | 370/313 |
| 6,567,664 B1 * | 5/2003 | Bergenwall et al. | 455/403 |
| 6,578,085 B1 * | 6/2003 | Khalil et al. | 709/241 |
| 6,654,359 B1 * | 11/2003 | La Porta et al. | 370/328 |
| 6,681,259 B1 * | 1/2004 | Lemilainen et al. | 709/250 |
| 6,763,007 B1 * | 7/2004 | La Porta et al. | 370/331 |
| 6,769,000 B1 * | 7/2004 | Akhtar et al. | 707/103 R |
| 6,771,609 B1 * | 8/2004 | Gudat et al. | 370/254 |
| 6,804,221 B1 * | 10/2004 | Magret et al. | 370/338 |
| 6,822,971 B1 * | 11/2004 | Mikkonen | 370/475 |
| 6,842,456 B1 * | 1/2005 | Chen et al. | 370/401 |
| 6,892,069 B1 * | 5/2005 | Flynn | 455/432.1 |
| 6,915,345 B1 * | 7/2005 | Tummala et al. | 455/432.1 |

OTHER PUBLICATIONS

Chao et al, "The Implication of the next generation wireless network design cellular mobile IPv6", IEEE Transaction on Consumer Electronics, vol. 46, No. 3, Jun. 19, 2000, pp. 656-663.*
Ernst et al, "Extending Mobile IPv6 with Multicast to Support Mobile Networks in IPv6", IEEE 2000, pp. 114-121.*
Jacobs, "Security of Current Mobile IP Solutions", IEEE 1997, pp. 1122-1128.*
Malki, K. and Hesham Soliman, "Hierarchical Mobile IPv4/v6 and Fast Handoffs"; Mobile IP Working Group (Mar. 2000).
Narten, T. et al.; "Neighbor Discovery for IP Version 6 (IPv6)"; Network Working Group (Dec. 1998).
Glass, S. et al.; "Mobile IP Authentication, Authorization, and Accounting Requirements"; Network Working Group (Oct. 2000).
Johnson, D. et. al.; "Mobility Support in IPv6"; Internet Engineering Task Force (Jul. 2000).

* cited by examiner

*Primary Examiner*—Chau Nguyen
*Assistant Examiner*—Phuongchau Ba Nguyen
(74) *Attorney, Agent, or Firm*—Hemingway & Hansen, LLP; D. Scott Hemingway; Malcolm W. Pipes

(57) ABSTRACT

The invention provides for an improved method and system of registration and hand-off procedures for a mobile node in a packet-based communication network. The present invention obtains expanded addresses over past systems. The invention can also use serving mobility managers to obtain a care-of address to route data-packets while on the foreign sub-network. The invention improves efficiency and reduces message overhead during registration and hand-off.

20 Claims, 12 Drawing Sheets

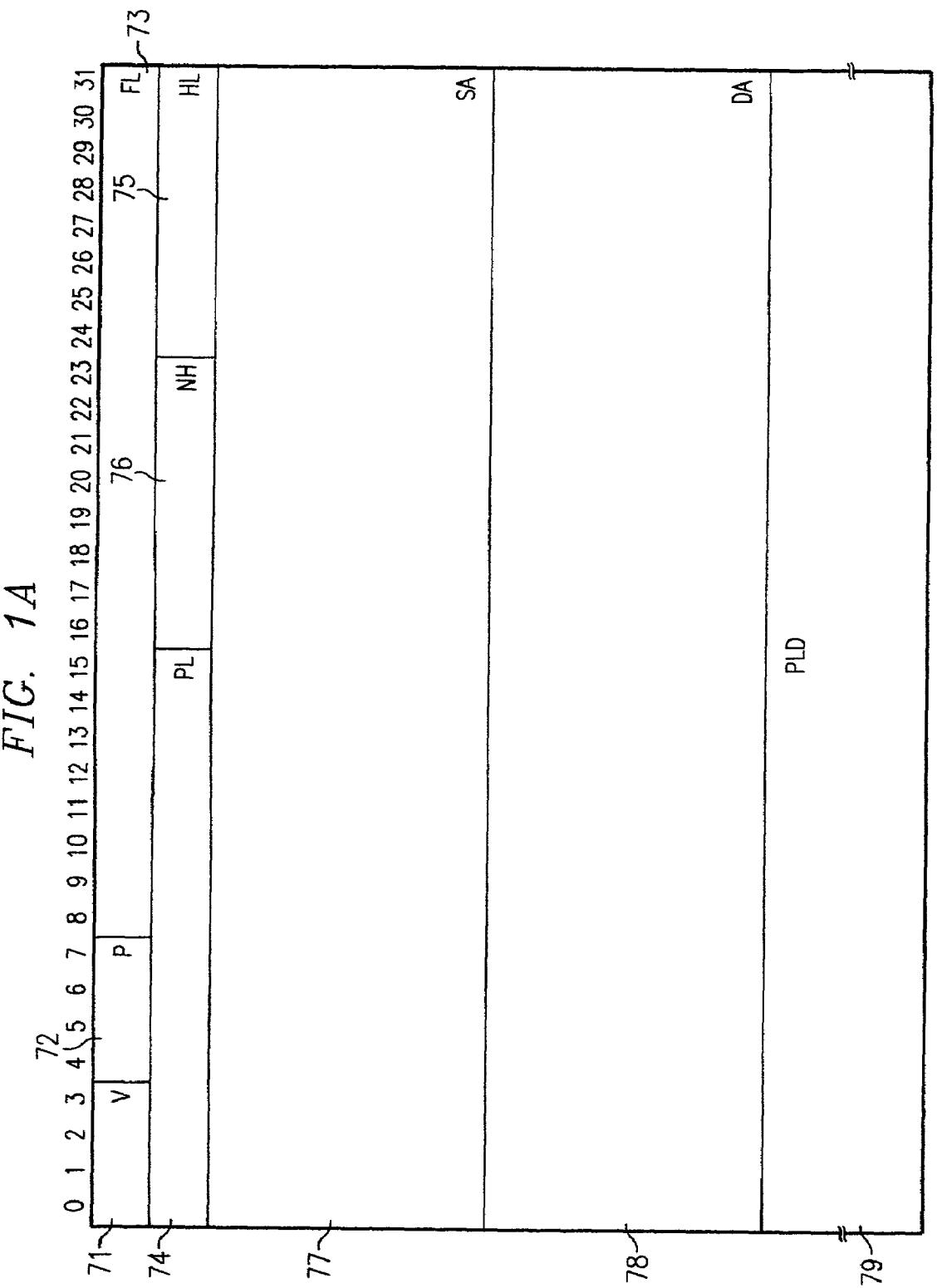

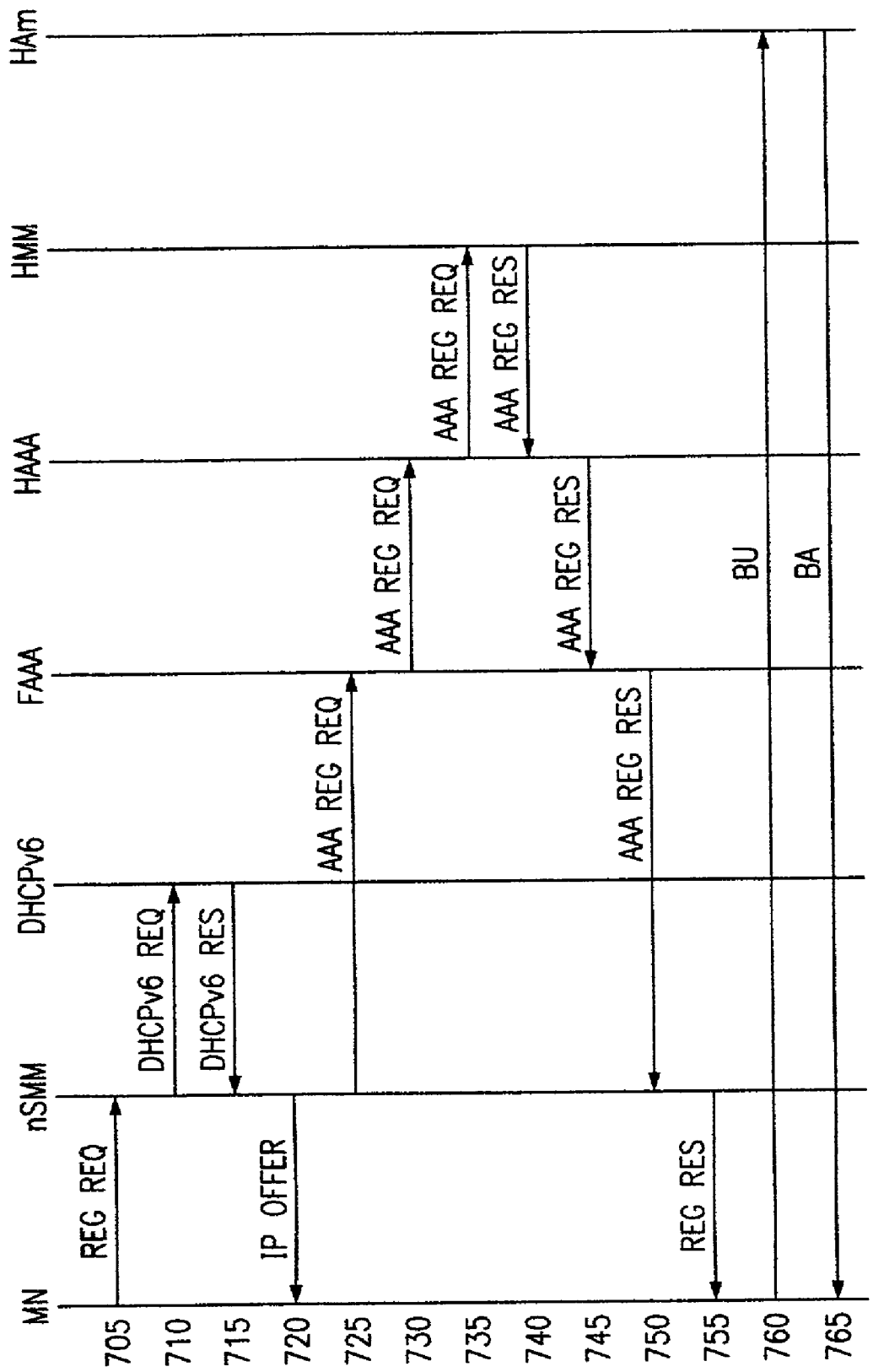

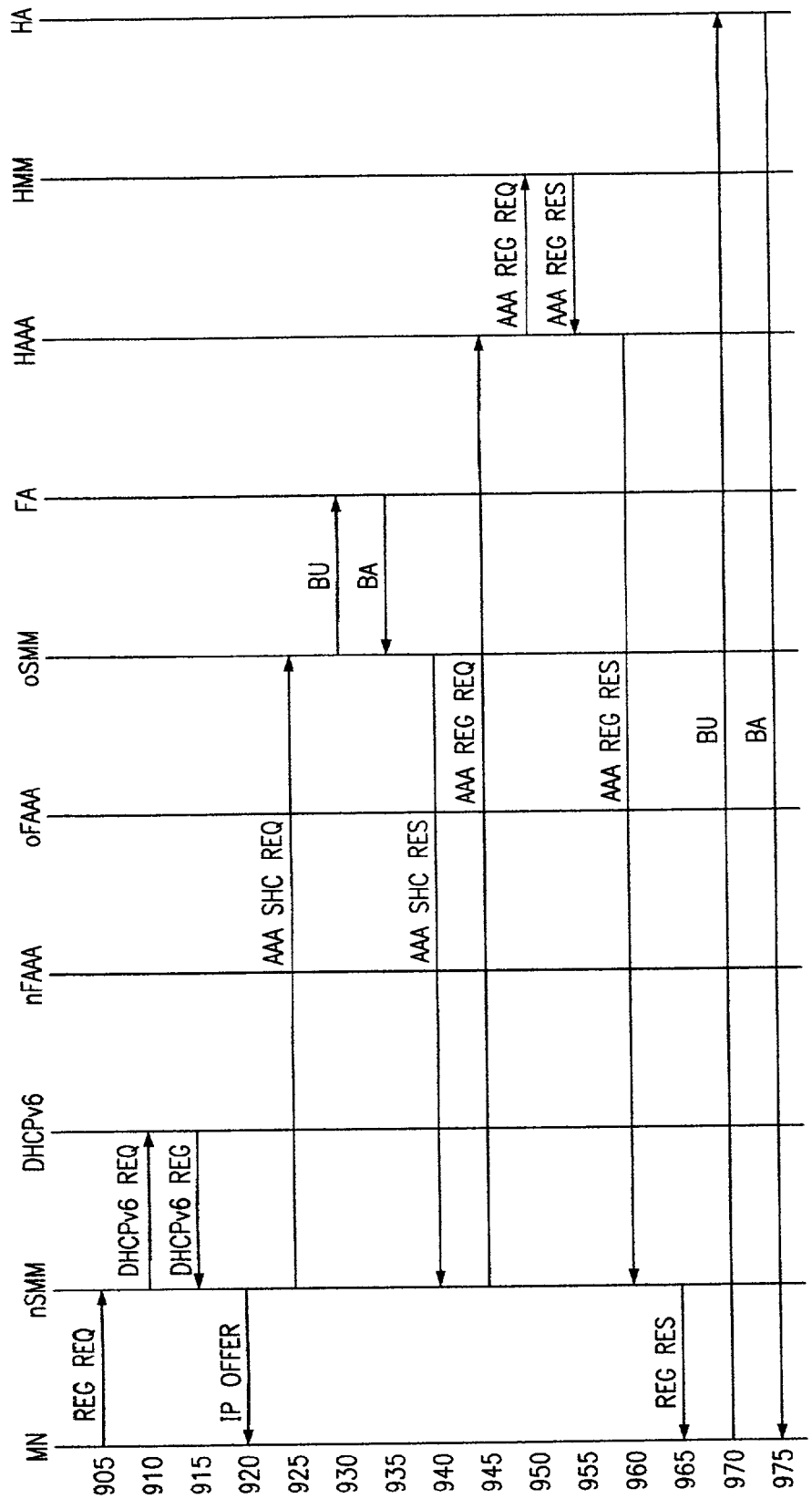

ASSISTED POWER-UP AND HAND-OFF SYSTEM AND METHOD

RELATED APPLICATION DATA

This application is the utility patent application related to provisional application Ser. No. 60/238,899 filed Oct. 10, 2000.

TECHNICAL FIELD OF THE INVENTION

A power-up and hand-off communication protocol in a packet-based communication system.

BACKGROUND OF THE INVENTION

Present-day Internet communications represent the synthesis of technical developments begun in the 1960s. During that time period, the Defense Department developed a communication system to support communications between different United States military computer networks, and later a similar system was used to support communications between research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of computer networks located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in most packet switching networks that connect or have the potential for utilizing connectivity across networks or sub-network boundaries.

A computer operating on a network is assigned a unique physical address under the TCP/IP protocols. This is called an IP address. The IP address can include: (1) a network ID and number identifying a network, (2) a sub-network IP number identifying a substructure on the network, and (3) a host IP number identifying a particular computer on the sub-network. A header data field in the information packet will include source and destination addresses. The IP addressing scheme imposes a sensible addressing scheme that reflects the internal organization of the network or sub-network.

A router is located on a network and is used to regulate the transmission of information packets into and out of computer networks and sub-networks. A router interprets the logical address of an information packet and directs the information packet to its intended destination. Information packets addressed between computers on the sub-network do not pass through the router to the greater network, and as such, these sub-network information packets will not clutter the transmission lines of the greater network. If data is addressed to a computer outside the sub-network, the router forwards the data onto the greater network.

The TCP/IP network includes protocols that define how routers will determine the transmission path for packets through the network. Routing decisions are based upon information in the IP header and entries in a routing table maintained on the router. A routing table possesses information for a router to make a determination on whether to accept the communicated information packet on behalf of a destination computer or pass the information packet onto another router.

The routing table can be configured manually with routing table entries or with a dynamic routing protocol. In a dynamic routing protocol, routers update routing information with periodic information packet transmissions to other routers on the network. The dynamic routing protocol accommodates changing network topologies, network architecture, network structure, layout of routers, and interconnection between hosts and routers.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) can be called a mobile node. Typically, a mobile node maintains connectivity to its home network through a foreign network. The mobile node will always be associated with its home networks for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

Authenticate, Authorize, and Accounting

In an IP-based mobile system, the mobile node maintains its connectivity to the home system through a foreign network. While coupled to a foreign network, the mobile node will be assigned a temporary IP address, so information packets addressed to the mobile node can be routed to the temporary EP address for the mobile node on the foreign network.

When a mobile node is operating on a foreign network, specialized servers are used to authenticate, authorize, and collect accounting information for services rendered to the mobile node. This authentication, authorization, and accounting activity is called "AAA," and AAA computer servers on the home and foreign network perform the AAA activities.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server performs the accounting functions by tracking usage on the network.

Functionally, a mobility manager will communicate with the AAA server in the current domain, allocating another router to route information packets destined for a mobile node while it is located away from its home sub-network. The mobility manager may have access to authentication and key generation AAA functions to authenticate and generate session keys. The mobility manager may also perform agent functions to forward packets to the mobile node until registration is completed.

IP Mobility Protocol

During the formative years since the Internet was first established, Internet Protocol version 4 (IPv4) was recognized and adopted as the standard Internet protocol. With the advent of mobile IP and proliferation of computers and computer systems linked to the Internet, various limitations in the IPv4 standard and associated procedures have developed and emerged. The most pressing limitation in IPv4 is the restriction on number of IP addresses. As shown in FIG. 1B, the address field size in an IPv4 packet is only 32 bits.

A number of benefits emerge from having a larger address field. First, there is little chance of exhausting the number of possible IP addresses. Second, a large address field allows aggregation of many network-prefix routers into a single network-prefix router. Finally, large addresses allow nodes to auto configure using simple mechanisms. More efficient system designs are thus possible with an expanded address space. Thus, there is a need for an IP standard with a larger IP address space.

In wireless IP networks and sub-networks (divisions of a network), mobile nodes can be physically located anywhere on the network or sub-network. Wireless IP networks handle the mobile nature of mobile nodes with power-up and hand-off procedures designed to inform the mobile node's home network and sub-network of the location of the mobile node for packet routing purposes. Because mobile nodes can move within sub-networks and between networks, hand-off procedures need to be implemented to insure that packets are continually routed to the mobile node as it moves from one network to another or from one sub-network to another.

Current protocols for obtaining a care-of address and procedures for power-up registration and hand-off procedures are insufficient to handle current packet-based communication demands. For example, the prior power-up and hand-off protocols utilize system architecture that was designed to operate within the constraints of IPv4's limited address space. These constraints are insufficient for supporting a standard that needs a larger address space and the associated network design architecture. Therefore, a need exists to establish a new user protocol for power-up and hand-off procedures for mobile IP networks using an expanded address space.

A new protocol for power-up and hand-off is also needed to satisfy the following criteria:

1) Data transfer to a given mobile node should not be hampered by the introduction of additional functional architecture, 2) The new protocol should require only minimal extensions and should exploit and track evolving routing and addressing capabilities, 3) The new protocol should be generic and independent of the type of wireless technology or access medium, 4) The protocol should fully support and be consistent with an AAA architecture, 5) The new protocol should optimize air interface usage for efficiency, reducing the number of required overhand messages, such as Binding Update and Binding Acknowledgement messages, and 6) The protocol should also offer protection against overuse or monopolization of resources by certain mobile nodes.

SUMMARY OF THE INVENTION

The present invention offers new methodologies or protocols for establishing a communication link with a mobile node at power-up and maintaining that link with hand-off procedures on or between networks. The invention uses care-of addressing located in an expanded address field in request and response messages. The invention also, at times, uses Dynamic Host Configuration Protocol (DHCP) servers and AAA computer servers to facilitate power-up registration and hand-off procedures involving a mobile node. Using the DHCP server streamlines the procedure, reducing packet transmission overhead and improving the efficiency of the system.

The first embodiment of the invention is called Intra-Domain Power-Up Registration. This embodiment specifies registration message flow when a mobile node powers-up in a foreign sub-network located on a home domain, sending registration message through a serving mobility manager (SMM) to a DHCP server.

The second embodiment is for Reactive Intra-Domain Hand-off, and this embodiment is used when the mobile node is performing hand-off from a sub-network to another sub-network within the home network. In this embodiment, the mobile node has no forewarning of the move from one sub-network to another.

The third embodiment is a Proactive Intra-Domain Hand-off. This embodiment is used where the mobile node has knowledge that it will move to a new sub-network, but the mobile node does not yet have a link layer connectivity established with the new sub-network.

The fourth embodiment of the invention is the Inter-Domain Power-Up Registration protocol, which is used when the mobile node powers up on a foreign domain. In this embodiment, the mobile node registers through the AAA server on the foreign network.

The fifth embodiment of the invention is the Reactive Inter-Domain Hand-off protocol, which is used when the mobile node moves into a new foreign domain. The mobile node in this embodiment must use the AAA server to register on the foreign network.

The sixth embodiment of the invention is the Proactive Inter-Domain Hand-off and covers the situation where the mobile node is aware that it will move to a new sub-network that is part of a foreign network, but the mobile node does not have a link connectivity established with the new foreign sub-network.

The present invention uses an expanded address format over IPv4, and is intended to reduce the amount of registration control, management messages (e.g. Request and Response messages), and information messages (e.g. Binding Update and Binding Acknowledgement). This invention will increase efficiency of transmission and speed up the mobile IP systems because it reduces the amount of overhead message transmission and routing.

BRIEF DESCRIPTION OF THE DRAWINGS

The objects and features of the invention will become more readily understood from the following detailed description and appended claims when read in conjunction with the accompanying drawings in which like numerals represent elements and in which:

FIG. 1A is the information packet format used in the present invention;

FIG. 8 is a message flow diagram for an Inter-Domain Power-Up Registration of the mobile node on the foreign network in FIG. 7;

FIG. 10 is a message flow diagram for the Reactive Intra-Domain Hand-off of the mobile node in FIG. 9;

DETAILED DESCRIPTION OF THE PREFERRED EMBODIMENTS

Figure 1:
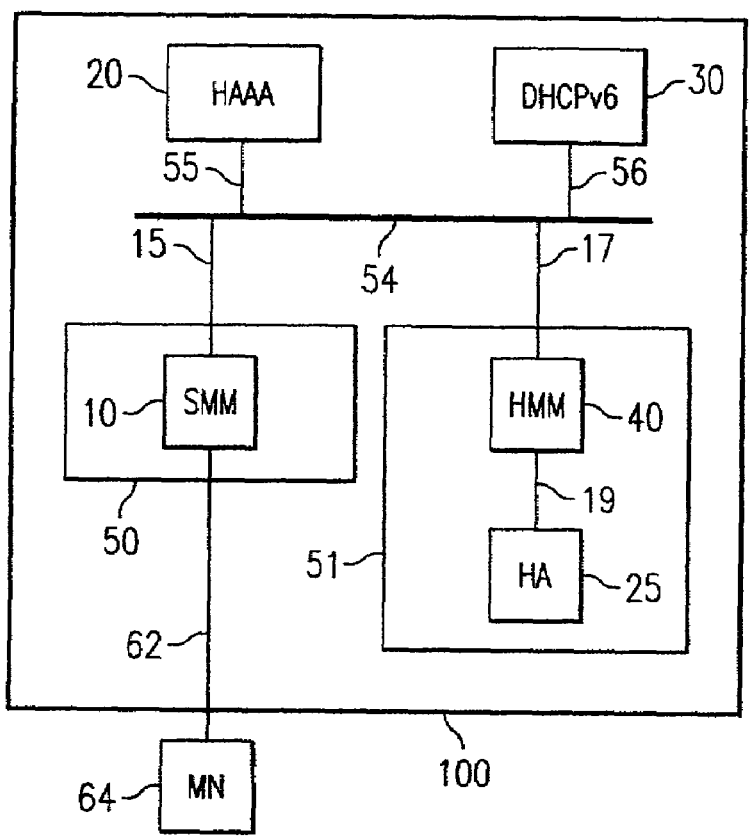
FIG. 1 is a communication network for the Intra-Domain Power-Up Registration embodiment where a mobile node powers-up on a foreign sub-network of its home network.

FIG. 1 shows a Mobile Node (MN) 64 powering up on a foreign sub-network 50 of a home network 100. The home network 100 has a central buss line 54 coupled to a home AAA server (HAAA) 20 by communication link 55, a DHCPv6 server 30 coupled by communication link 56 to the buss line 54, a home mobility manager (HMM) 40 coupled by communication link 17 to the buss line 54, and a serving mobility manager (SMM) 10 coupled by communication link 15 to the buss line 54. The home sub-network 51 of the MN 64 consists of the HMM 40 coupled to the home agent 25 by communication link 19. The foreign sub-network 50 consists of the SMM 10. MN 64 is linked to SMM 10 by a communication link 62, which may be a wired or wireless connection.

Figure 2:
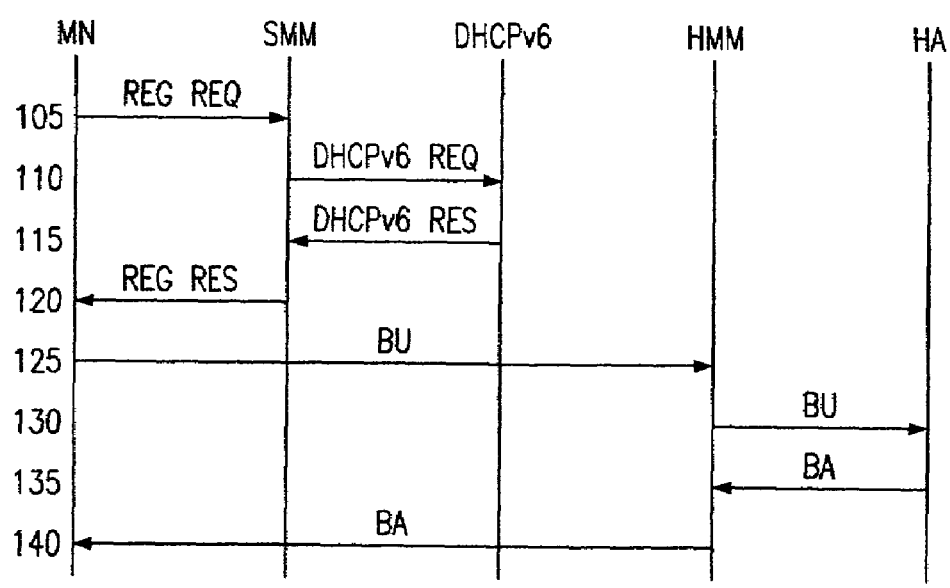
FIG. 2 is a message flow diagram for registration of the mobile node in the embodiment of FIG. 1 for an Intra-Domain Power-Up Registration.

In FIG. 1, the MN 64 is powering up on a foreign sub-network 50. FIG. 2 shows the registration message flow for the situation where the MN 64 powers up on a foreign sub-network within the home network. This embodiment is referred to as an Intra-Domain Power-Up Registration. The MN 64 constructs a local IP address for use on the foreign sub-network 50 by sending a Registration Request message (Reg Req) 105 to the SMM 10. This Reg Req 105 is for allocation of a co-located, globally routable long-term IP address for the MN 64 while it remains on the current sub-network 50. The Reg Req 105 also contains coincidental information to verify the identity of the MN 64. The SMM 10 will validate the identity of the MN 64, and then send a DHCPv6 Request message (DHCPv6 Req) 110 to the DHCPv6 server 30 requesting a new address for MN 64. The DHCPv6 server 30 allocates a new address to use as a care-of address and sends a DHCPv6 Reply message (DHCPv6 Rep) 115 back to the SMM 10 with the new address. The SMM 10 relays this new address to the MN 64 with a Registration Response message (Reg Res) 120. The format of the IP header in the Registration Response message Reg Res 120 is shown in FIG. 1A.

FIG. 1A shows the new information packet's IP header format with an expanded address field. The Version (V) field 71 is a 4-bit long data field that is used to designate the IP version number. The Priority (P) field 72 designates the desired delivery priority of the information packet. The Payload Length field (PL) 74 is the length of the rest of the packet following the IP header fields in octets. The Next Header field (NH) 76 identifies the type of header immediately following the IP header fields. The Hop Limit field (HL) 75 is an 8-bit integer value that is decremented by 1 for each node that forwards the packet. The Source Address field (SA) 77 is the 128-bit address of the source node of the information packet. The Destination Address field (DA) 78 is the 128-bit address of the intended destination node. Various message extension types, additional headers, and data fields can be found in the Payload fields (PLD) 79, the Reg Res 120 and Reg Req 105 being two of the possible types. The 128-bit care-of address will be in one of these PLD fields 79 in Reg Res 120.

Figure 1B:
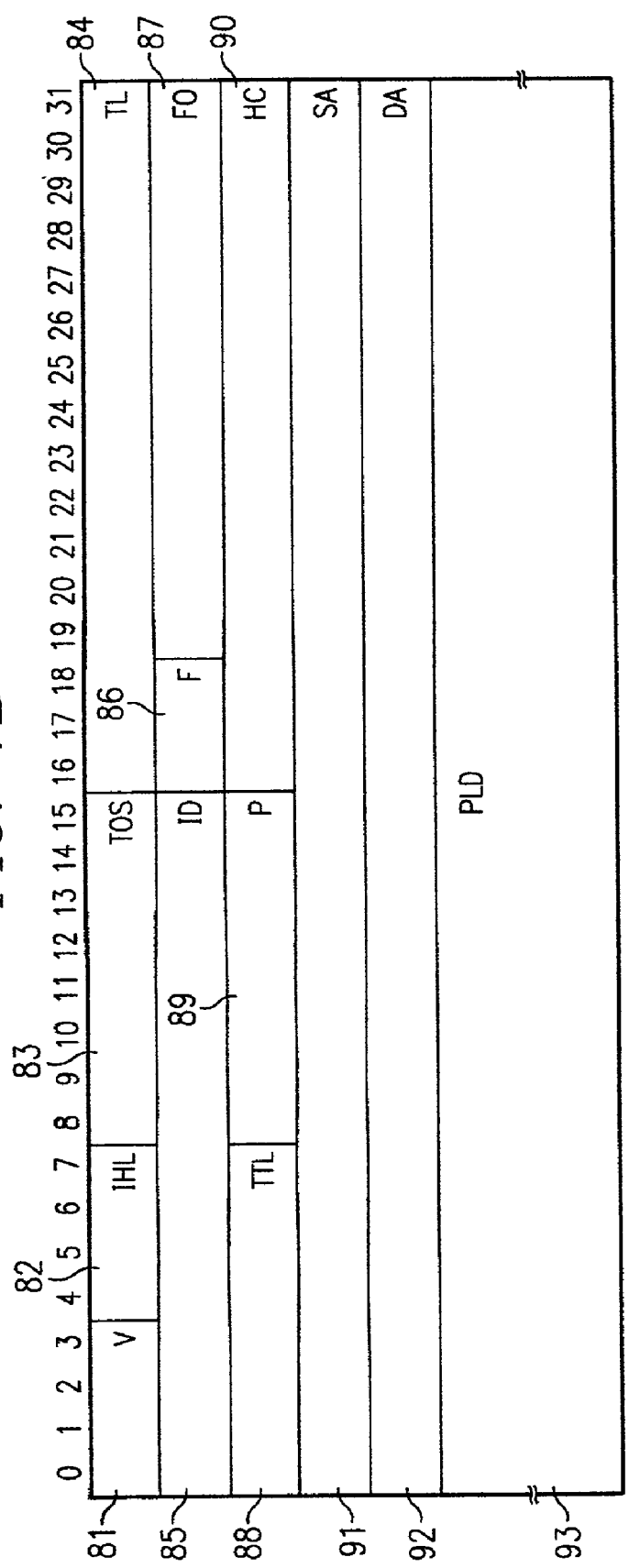
FIG. 1B is the prior art information packet format.

FIG. 1B shows the prior art IPv4 information packet's IP header format. The Version (V) field 81 is a 4-bit long field that is used to designate the IP version number (version 4 in this case). The Internet Header Length field (IHL) 82 is 4-bits long and is the length of the IP header in 32-bit words. The Type of Service (TOS) field 83 is 8-bits long and is an abstract indication of the quality of service desired. The Total Length (TL) field 84 is 16-bits long and is the length of the information packet in octets.

The Identification field (ID) 85 is 16-bits long and is assigned by the source node to aid in assembling fragments of an information packet at the destination node. The Flag field (F) 86 is a 3-bit field with control bit flags. The Fragment Offset field (FO) 87 is a 13-bit long field that indicates where the information packet belongs in a multiple-packet message. The Time-to-Live (TTL) field 88 is an 8-bit long field that indicates the maximum time the information packet will be allowed to exist in the system before deletion. The time unit indicated is seconds. The Protocol field (P) 89 will indicate the next protocol level used in the Payload portion (PLD) 95 used in the information packet. The header Checksum field (CS) 90 is used to verify the information packet.

The Source Address field (SA) 91 is a 32-bit field identifying the source of the information packet. The Destination Address field (DA) 92 is a 32-bit field identifying the intended destination of the information packet. The Payload fields (PLD) 93 are found after the IP header and include various message extensions, additional headers, and data fields. Compared to the IPv4 address fields, which include possible care-of addresses, the new message format shown in FIG. 1A offers address fields four times larger than found in IPv4.

The new address allocated by Reg Res 120 is used by the MN 64 as the care-of address for routing data packet while it remains on the foreign sub-network 50. After receiving the allocated new address, the MN 64 sends a Binding Update (BU) message 125 to the HMM 40 on the home sub-network 51. The HMM: 40 may allocate a router, HA 25, to provide routing and other services to the MN 64. If the HMM 40 allocates HA 25, a Binding Update (BU) message 130 is transmitted to HA 25. The allocated HA 25 registers the MN 64 and responds with a Binding Acknowledgement (BA) message 135 to the HMM 40. The HMM 40 will transmit a Binding Acknowledgement (BA) message 140 back to MN 64 confirming receipt of the BU 125 and binding.

Figure 3:
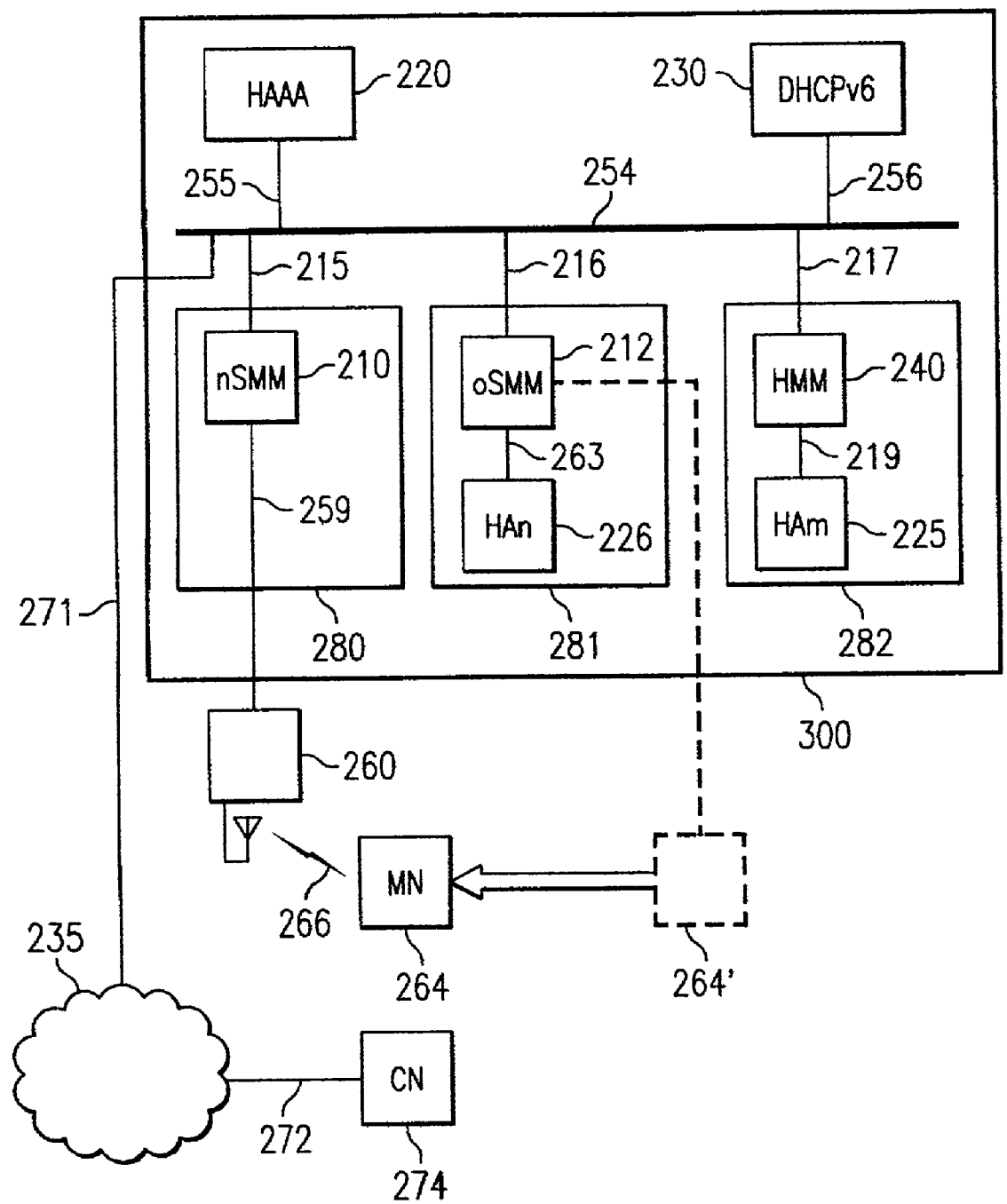
FIG. 3 is a communication network for the Reactive Intra-Domain Hand-off with a mobile node moving from a sub-network, with no advance notice, to a foreign sub-network.

FIG. 3 depicts the situation where a mobile node moves unexpectedly from one sub-network 281 to another sub-network 280 within a home network 300 and must perform a hand-off routine. The embodiment to handle this situation is referred to as a Reactive Intra-Domain Hand-off. FIG. 3 shows a MN 264 linked to a transceiver 260 by a communication link 266. The transceiver 260 is linked to a sub-network 280 on network 300 via new SMM (nSMM) 210 by communication link 259. Although this link to the network 300 is a wireless connection, alternatively the connection could be a wired connection linking the MN 264 to the nSMM 210. The sub-network 280 consists of nSMM 210, and it is a foreign sub-network 280 for the MN 64 on the home network 300. The nSMM 210 is linked to a central buss line 254 by communication link 215. A home AAA server (HAAA) 220 is coupled to the buss line 254 by communication link 255, and a DHCPv6 server 230 is coupled to buss line 254 by communication link 256. The old SMM (oSMM) 212 is coupled to the buss line 254 by communication link 216. A home agent (HAn) 226 is connected to oSMM 212 by communication link 263. The oSMM 212 and HAn 226 form another foreign sub-network 281 on the home network 300.

A HMM 240 is coupled to the buss line 254 by communication link 217, and a home agent (HAm) 225 is coupled to HMM 240 by communication link 219. The HMM 240 and HAm 225 are the MN 64's home sub-network 282 on home network 300. The network 300 is linked to the Internet 235 by communication link 271 connected to central buss line 254. A correspondence node (CN) 274 is also linked to the Internet 235 by communication link 272, which may be a wired or wireless link. MN 264' is the prior location of MN 264, which is shifting connection on network 300 as shown.

Figure 4:
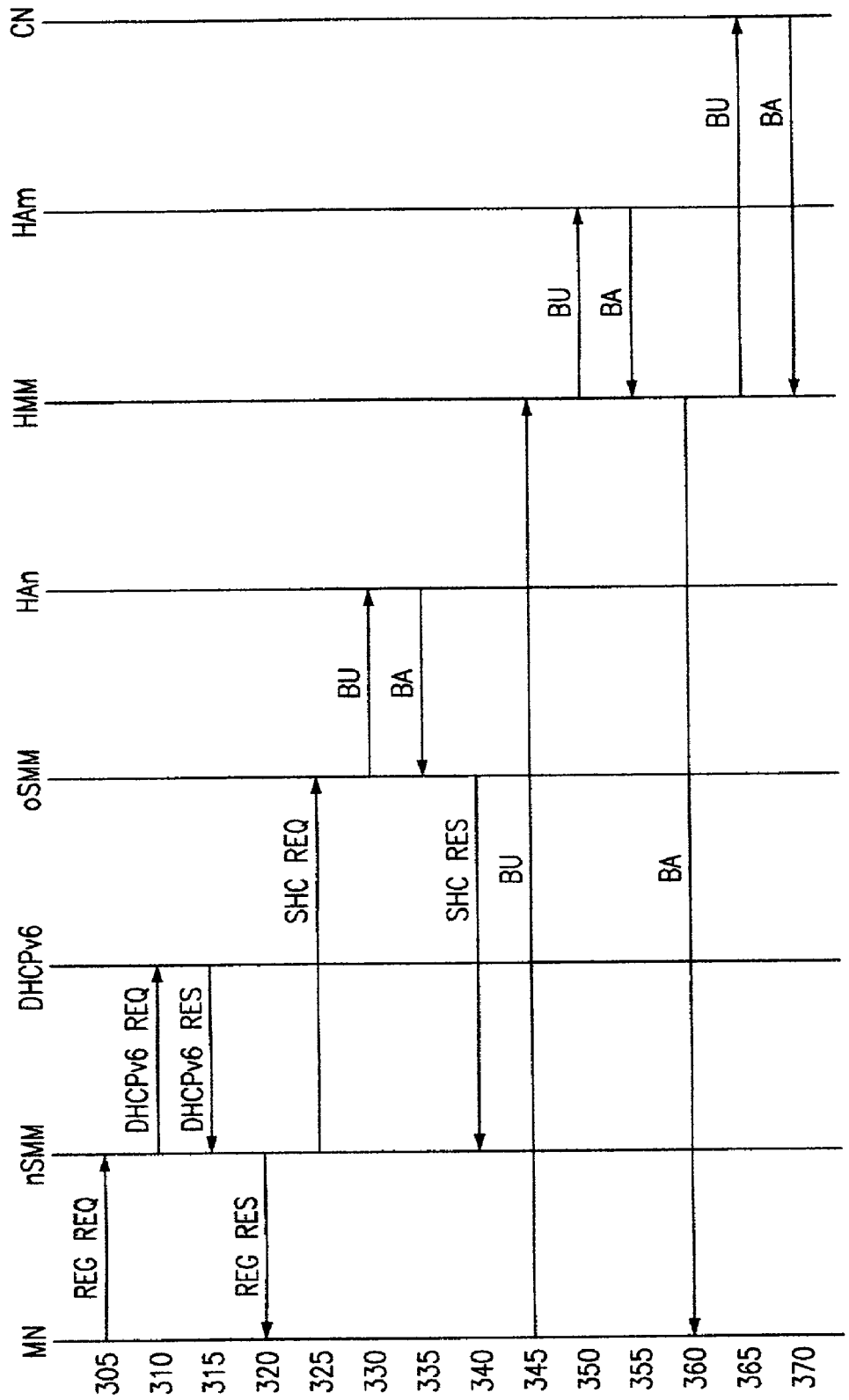
FIG. 4 is a message flow diagram for the Reactive Intra-Domain Hand-off for a mobile node performing a hand-off in FIG. 2.

In FIG. 3, the MN 264' is shown connected to the foreign sub-network 281 and is moving unexpectedly from an area covered by oSMM 212 on foreign sub-network 280 to an area covered by nSMM 210 on foreign sub-network 281. FIG. 4 shows the message flow for this embodiment where MN 264 is performing hand-off from one foreign sub-network 281 to another foreign sub-network 280 within a home network 300 without prior notice. This new embodiment is referred to as a Reactive Intra-Domain Hand-off.

In FIG. 4, the MN 264 constructs a local IP address for use on the foreign sub-network by sending a Reg Req message 305 to the nSMM 210. The Reg Req 305 is for allocation of a globally routable IP address for MN 264 to use on the current sub-network 280. The format of the IP header for Reg Req 305 is the same as shown in FIG. 1A. The MN 264 will also provide coincidental information to verify its identity in the Reg Req 305. The nSMM 210 verifies the identity of the MN 264 and then transmits a DHCPv6 Req 310 to the DHCPv6 server 230 requesting allocation of an IP address. The DHCPv6 server 230 allocates a care-of address and transmits a DHCPv6 Res 315 back to the nSMM 210 with the care-of address. The nSMM 210 then transmits a Reg Res message 320 containing the allocated new address.

After forwarding the Reg Res 320 to the MN 264, the nSMM 210 transmits a System Hand-off and Context Request message (SHC Req) 325 to the oSMM 212. Upon receiving the SHC Req 325, the oSMM 212 will task HAn 226 to forward information packets from the previous care-of address to the new care-of address (e.g. the new address allocated by DHCPv6 server 230). To task HAn 226, the oSMM 210 sends a Binding Update message (BU) 330 to HAn 226 along the same link the previous care-of address is located on. The HAn 226 responds with a Binding Acknowledgement message (BA) 335. The oSMM 212 then sends a System Hand-off and Context Reply (SHC Rep) 340 back to nSMM 210 providing user context data, which is composed of information such as session keys for the type of services granted.

After being assigned a care-of address in the Reg Res 320 and receiving context data, the MN 264 sends a BU 345 to the HMM 240, which includes a list of all IP addresses of all correspondent nodes the MN 264 is communicating with (e.g. CN 274). When the HMM 240 receives the BU 345, it allocates a home agent—HAm 225—to serve the MN 264, and sends a BU 350 to bind the designated HAm 225. The HAm 225 processes and validates the BU 350. After completing processing of the BU 350, the HAm 225 sends a BA 355 to the HMM 240.

Upon receipt of the BA 355, the HMM 240 sends a BA 360 to the MN 264, and the HMM 240 updates all the correspondence nodes listed by the MN 264 in the BU 345 (e.g. CN 274) with the care-of address. This is accomplished by sending a BU 365 to CN 274 (and any other node), which will reply with a BA 370. After a specified period of time to allow forwarding of all messages, the allocation of HAn 226 expires, because all future messages are forwarded to the care-of address and/or the HAm 225.

Figure 5:
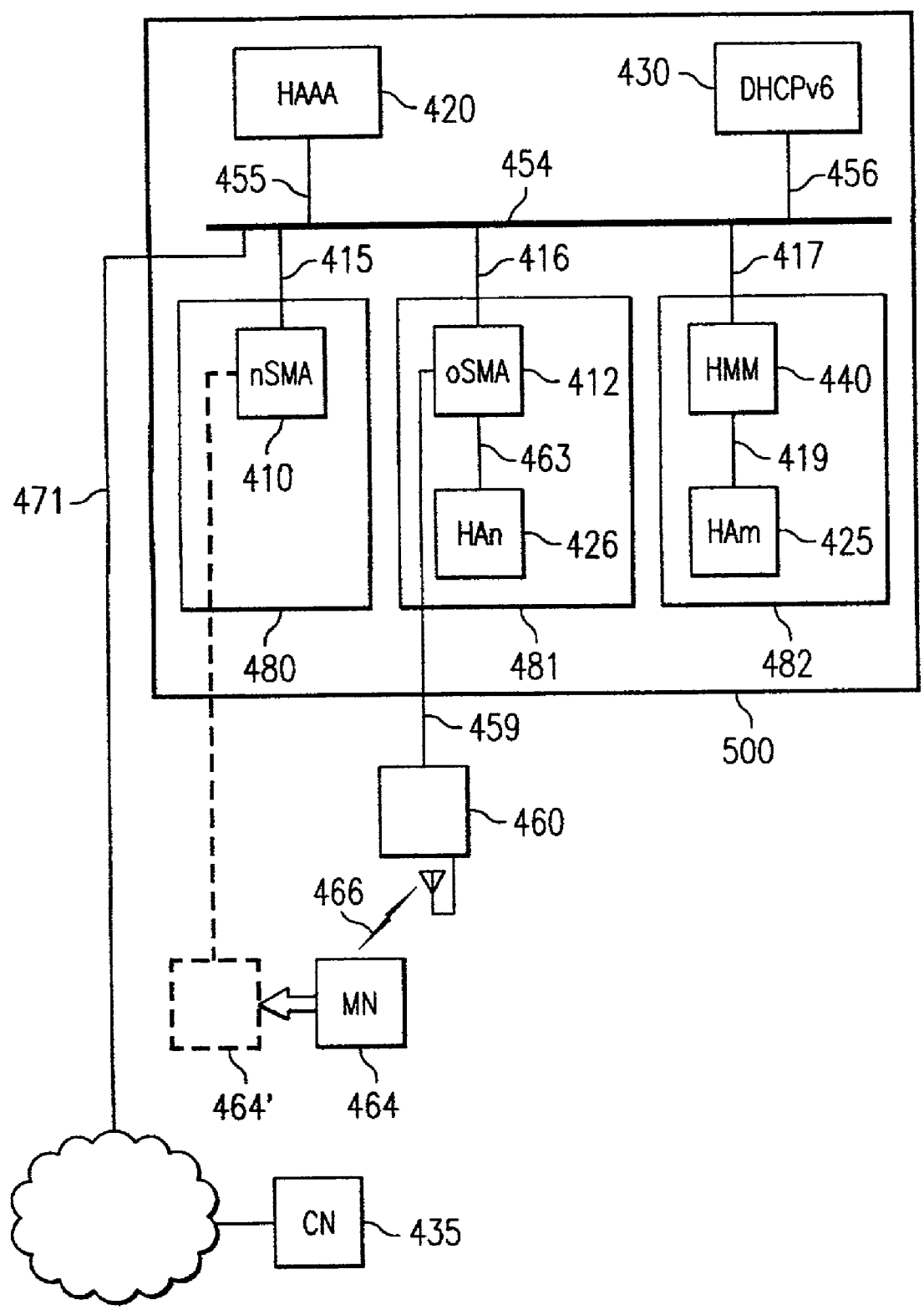
FIG. 5. is a communication network with a mobile node performing a Proactive Intra-Domain Hand-off moving, with advance notice, from a sub-network to a foreign sub-network on a home network.

FIG. 5 depicts a MN 464 linked to a foreign sub-network 481 on its home network 500. The MN 464 is aware it will move to a new foreign sub-network 480, which consist of an nSMM 410, but the MN 464 does not yet have a link layer connectivity established with the new sub-network 480. The home network 500 consists of a HAAA server 420, a DHCPv6 server 430, nSMM 410, a HMM 440, a HAm 425, an oSMM 412, and a HAn 426.

The MN 464 is connected to a transceiver 460 by wireless link 466. The transceiver 460 is connected to the oSMM 412 by communication link 459. Although this communication link from the MN 464 to the oSMM 416 includes a wireless connection, this link could alternatively be a wired connection linking MN 264 to oSMM 412. The oSMM 412 is coupled to a HAn 426 by communication link 463 and to bus line 454 by communication link 416. Foreign sub-network 481 consists of oSMM 412 and HAn 426.

The DHCPv6 server 430 is connected to buss line 454 by communication link 456. The HAAA 420 is connected to buss line 454 by communication link 455. The HMM 440 is connected to buss line 454 by communication link 417. HMM 440 is also connected to HAm 425 by communication link 419. Home sub-network 482 consists of nHMM 440 and HAm 425. The nSMM 410 is connected to the buss line 454 by communication link 415, and foreign sub-network 480 consists of nSMM 410. The home network 500 is connected to the Internet 435 by communication link 471 to buss line 454. Correspondence node (CN) 474 is connected to the Internet 435 by communication link 472, which may or may not include a wireless link. The MN 464' connected to nSMM 410 is the future location of MN 464.

Figure 6:
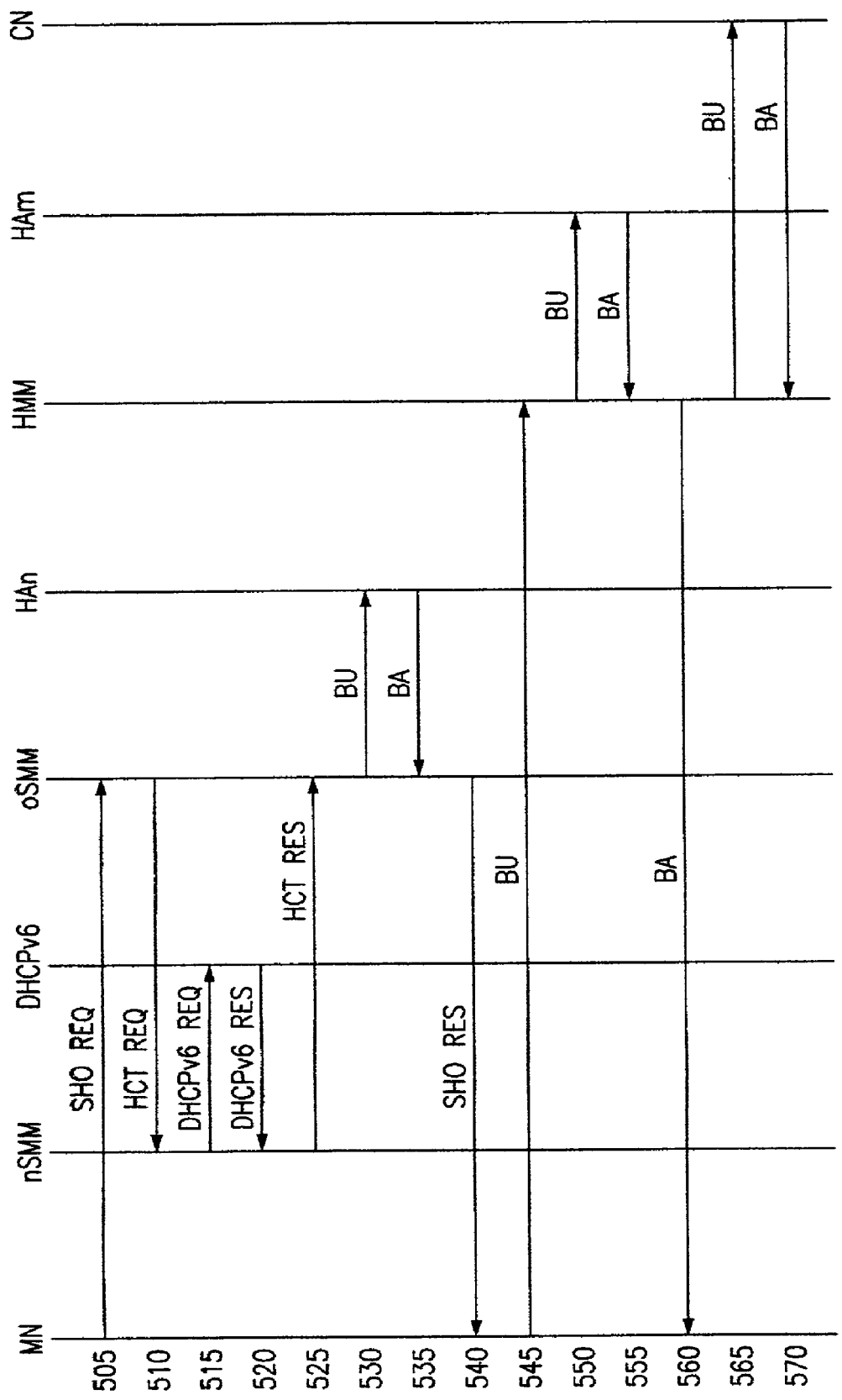
FIG. 6 is a message flow diagram for a mobile performing a Reactive Intra-Domain Hand-off in FIG. 5.

FIG. 6 shows the message flow for the embodiment in FIG. 5, referred to as a Proactive Intra-Domain Hand-off. When the MN 464 detects that it will move to new sub-network 480 on the home network 500, it sends a System Hand-off Request message (SHO Req) 505 to the oSMM 412, the current serving mobility manager on sub-network 481. The format of EP header for SHO Req 505 is the same as shown in FIG. 1A. The oSMM 412 transmits a Hand-off and Context Transfer Request message (HCT Req) 510 to the nSMM 410 on the sub-network 480, the future serving mobility manager. The nSMM 410 sends a DHCPv6 Req 515 to the DHCPv6 430 requesting a new address to allocate as a care-of address. The DHCPv6 430 transmits the care-of address to the nSMM 410 in a DHCPv6 Res 520.

The nSMM 410 transmits a Hand-off and Context Transfer Response (HCT Res) 525 allocating a care-of address to the oSMM 412. The oSMM 412 allocates HAn 426 to bi-cast the data destined to MN 464 to both the old and new care-of address. To accomplish this, a BU 530 is transmitted from the oSMM 412 to HAn 426, which will respond with a BA 535 to oSMM 412. The oSMM 412 will then send a System Hand-off Response message (SHO Res) 540 to confirm execution of the hand-off procedures and transmit the allocated care-of address to MN 464.

After the MN 464 receives SHO Res 540 from oSMM 412 and establishes a Layer-2 connectivity with the nSMM 410 on new sub-network 480, it will send BU 545 to HMM 440 to update the current binding on the home sub-network 482 with the new care-of address. The HMM 440 will update the binding to HAm 425 by sending a BU 550 to HAm 425, which in turn will transmit a BA 555 to the HMM 440. The HMM 440 will transmit a BA 560 to the MN 440 acknowledging the BU 545. The HMM 440 will also update the binding on CN 474 with the care-of address by transmitting a BU 565 to the CN 474, and the CN 474 will acknowledge with a BA 570. If the MN 464 does not receive a SHO Res 540 from oSMM 412 because it has Layer-2 disconnection with the current foreign sub-network 481, the MN 464 will initiate the Reactive Intra-Domain Hand-off protocol.

Figure 7:
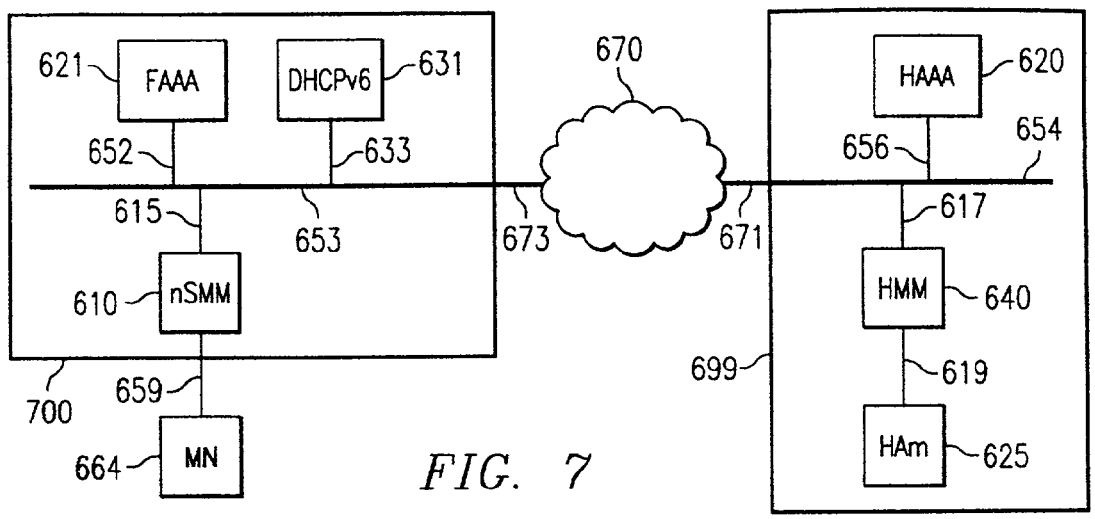
FIG. 7 shows a home communication and a foreign communication network with a mobile node powering up on the foreign network in an Inter-Domain Power-Up Registration.

FIG. 7 shows MN 664 powering up on a foreign network 700. The MN 664 is connected to the foreign network 700 by communication link 659. The foreign network 700 includes the FAAA 621, the DHCPv6 631, and the nSMM 610. The communication link 659 can be a wired or wireless connection. Communication link 659 is connected to the nSMM 610. The nSMM 610 is coupled to a buss line 653 by communication link 615. The foreign AAA server (FAAA) 621 is coupled to the buss line 653 by communication link 652, and the DHCPv6 server 631 is coupled to the buss line 653 by communication link 633.

The foreign network 700 is coupled to the Internet 670 by communication link 673, which is coupled to buss line 653. The Internet 670 is coupled to the home network 699 by communication link 671, which is connected to buss line 654.

The home network 699 includes the HAAA 620, the HMM 640, and the HAm 625. A home AAA (HAAA) server 620 is coupled to buss line 654 by communication link 656. A HMM 640 is connected to buss line 654 by communication link 617, and HMM 640 is connected to HAm 625 by communication link 619.

When the MN 664 powers up on foreign network 700, FIG. 8 shows the message flow under the new embodiment. This embodiment is referred to as an Inter-Domain Power Up Registration. The MN 664 sends a Reg Req 705 to the nSMM 610 on the foreign sub-network 700 to obtain a co-located, globally routable address. The format of the IP header for Reg Req 705 is the same as shown in FIG. 1A. The nSMM 610 validates the identity of the MN 664 using coincidental information in the Reg Req 705. After validation, the nSMM 610 transmits a DHCPv6 Req 710 to the DHCPv6 server 631. The DHCPv6 server 631 allocates a co-located IP address to use as a care-of address and sends a DHCPv6 Res 715 back to the nSMM 610 with the new care-of address.

At this point, the nSMM 610 may generate and transmit an optional IP Offer message 720 to the MN 664 containing the care-of address for temporary use while registration is completed. The nSMM 610 will generate and transmit an AAA Registration and Authentication Request message (AAA Reg Req) 725 to the FAAA 621. The FAAA 621 receives the AAA Reg Req 725 and forwards an AAA Registration and Authentication Response message (AAA Reg Res) 730 to the HAAA 620 based on the network access identifier extension (NAI) contained in the AAA Reg Req 725.

When the HAAA 620 receives an AAA Reg Req 730, it authenticates the identification and authorization of the MN 664. If the MN 664 authentication and authorization are affirmative, the HAAA 620 forwards the AAA Reg Req 735 to the HMM 640. The HMM 640 will process the AAA Reg Req 735. If the MN 664 lacks a home IP address, the MN 664 will have requested allocation of one. If requested, the HMM 640 will allocate a home IP address for the MN 664. If the home network 699 is provisioned with multiple home agents for load distribution, the HMM 640 may designate HAn 625 to serve the MN 664. The HMM 640 will then construct an AAA Registration and Authentication Response message (AAA Reg Res) 740 with this information on the designated HAn 625 and the authentication data and transmit an AAA Reg Res 740 to the FAAA 620.

The HAAA 620 will transmit an AAA Reg Res message 745 to the FAAA 621, which will contain a care-of address for use by the MN 664 allocated by the DHCPv6 sever 631 and any home IP address allocated by the HMM 640 as well as affirmative confirmation of AAA. The FAAA 621 will transmit an AAA Reg Res 750 to nSMM 610, and the nSMM 610 will generate and transmit a Reg Res 755 to the MN 664 containing the allocated care-of address and any home IP address. Once the MN 664 receives the Reg Res 755, it sends a BU 760 to the HMM 640 or any assigned HAm 625. The HMM 640 or HAm 625 will then respond with a BA 765, completing the registration.

Figure 9:
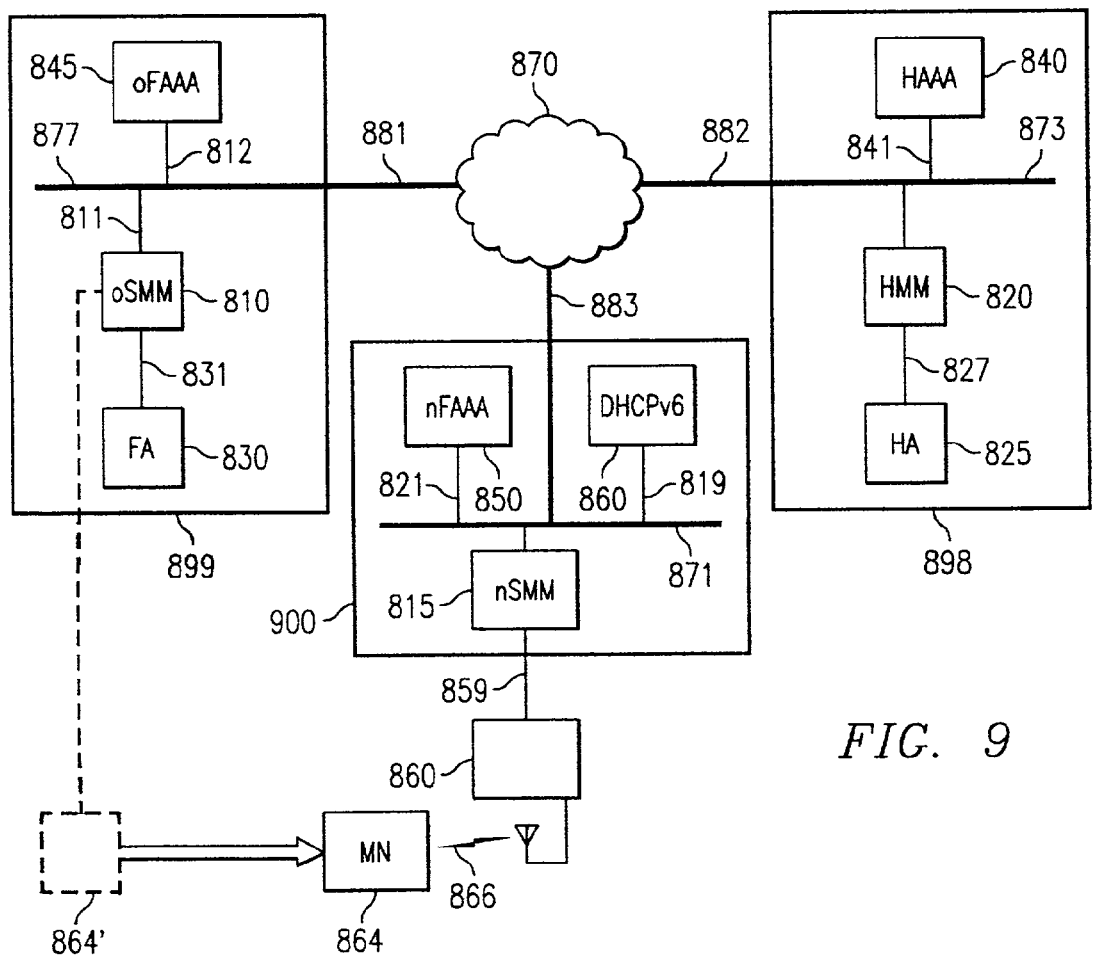
FIG. 9 shows a home communication network and two foreign communication networks, with a mobile node moving unexpectedly from one foreign network to another and performing a Reactive Inter-Domain Hand-off.

FIG. 9 depicts the situation where a MN 864 has moved and does a hand-off from one foreign network 899 to a new foreign network 900. FIG. 9 shows three networks 898, 899, and 900. The old foreign network 899 has an old FAAA server (oFAAA) 845, an old SMM (oSMM) 810, and a foreign agent (FA) 830. The new foreign network 900 has a new FAAA server (nFAAA) 850, a DHCPv6 server 860, and a new SMM (nSMM) 815. The home network 898 has a home AAA server (HAAA) 840, a home mobility manager (HMM) 820, and a home agent (HA) 825.

On the old foreign network 899, the FA 830 is connected to the oSMM 810 by communication link 831. The oSMM 810 is connected to a central buss line 877 by communication link 811, and the oFAAA 845 is connected to the central buss line 877 by communication link 812. Although a wireless connection is shown linking MN 864 to nSMM 815, alternatively the link connecting MN 864 to nSMM 815 could be a wired connection.

On the new foreign network 900, the MN 864 is connected to transceiver 860 by wireless link 866. The transceiver 860 is connected to the nSMM 815 by communication link 859, and the nSMM 815 is connected to central buss line 871 by communication link 817. The central buss line 871 is connected to nFAAA 850 by communication link 821 and to DHCPv6 server 860 by communication link 819. On the home network 898, the HAAA 840 is coupled to a central buss line 873 by communication link 841. The HMM 820 is connected to the central buss line 873 by communication link 823, and the HA 825 is connected to the HMM 820 by communication link 827.

The three networks, 898, 899, and 900 are also connected to the Internet 870. The old foreign network 899 is connected to the Internet 870 by communication link 881, which is coupled to the central buss line 877. The new foreign network 900 is connected to the Internet 870 by communication link 883, which is coupled to the central buss line 871. The home network 898 is connected to the Internet 870 by communication link 882, which is coupled to central buss line 873. MN 864' is shown moving from a location connected to oSMM 810 to a new location connected to nSMM 815.

FIG. 10 depicts the message flow for the embodiment where the MN 864 moves unexpectedly from one foreign network 899 to another foreign network 900 and performs a hand-off. This embodiment is referred to as a Reactive Inter-Domain Hand-off. The MN 864 sends a Reg Req 905 to the nSMM 815 to obtain a co-located, globally routable address. The format of the EP header for the Reg Req 905 is the same as shown in FIG. 1A. The nSMM 815 validates the identity of the MN 864, and then transmits a DHCPv6 Req 910 to the DHCPv6 server 860. The DHCPv6 server 860 allocates a new address to use as a care-of address and sends a DHCPv6 Res 915 back to the nSMM 815. At this point, an optional IP Offer message 920 containing the care-of address for temporary use until the registration process is complete may be sent to the MN 864 by nSMM 815. The nSMM 815 sends an AAA System Hand-off and Context Request message (AAA SHC Req) 925 to oSMM 810 to allocate an agent, FA 830, in the old foreign network 899.

The oSMM 810 will allocate FA 830 to forward information packets to the MN 860 by generating and transmitting a BU 930 to the FA 830. This will cause the FA 830 to forward information packets from the old care-of address to the new care-of address. This binding will last until registration is complete and then expire. The FA 830 will respond with a BA 935 back to the oSMM 810 acknowledging the BU 930.

The oSMM 810 will verify the AAA SHC Req 925 by sending an AAA System Hand-off and Context Response message (AAA SHC Res) 940 to the nSMM 815. The nSMM 815 will verify the message and allocate a co-located care-of address for the MN 864, which it will transmit to the MN 864. The nSMM 815 will generate and transmit an AAA Registration and Authorization Request message (AAA Reg Req) 945 to the nFAAA 850, which forwards the message to the HAAA 840 based on the network access identifier (NAI) extension in the MN 864 Reg Req 905.

When the HAAA 840 receives the AAA Reg Req 945, it authenticates the identification and authorization of the MN 864. If the MN 864 authentication and authorization are affirmative, the HAAA 840 forwards an AAA Reg Req 950 to the HMM 820. The HMM 820 will process the AAA Reg Req 950. If the MN 864 lacks a home IP address, the MN 664 will have requested allocation of one. If requested, the HMM 820 will allocate a home IP address for the MN 864. If the home network 699 supports more than one HA 825 for load distribution and balancing, the HMM 820 may designate a HA 825 to serve the MN 864.

The HMM 820 will construct an AAA Registration and Authorization Response (AAA Reg Res) 955 with this information on the designated HA 825 and the authentication data and transmit the message back through the HAAA 840 and nFAAA 850 to nSMM 815. The HAAA 840 will forward the AAA Reg Res 960 to nSMM 815. The nSMM 815 will generate and transmit a Reg Res 965 to the MN 864 containing the allocated, co-located care-of address, any home address for the MN 864, and confirmation of authorization and authentication. After receiving the Reg Res 965, the MN 864 completes the registration by sending a BU 970 to the HMM 820 or any assigned HA 825, which will acknowledge with a BA 975.

Figure 11:
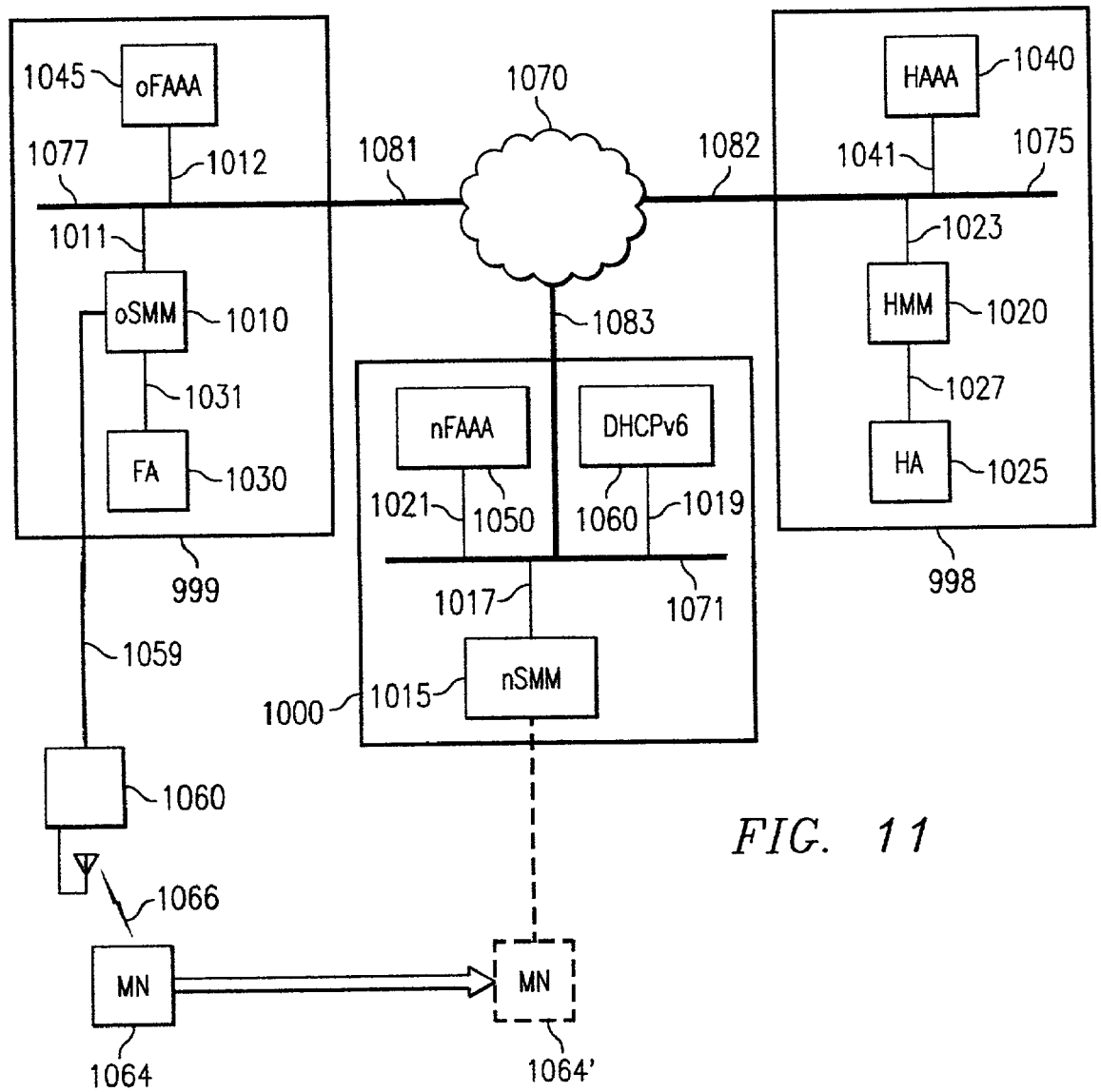
FIG. 11 shows a home communication network and two foreign communication networks, with a mobile node moving with advance notice from one foreign network to the other and performing a Proactive Inter-Domain Hand-off.

FIG. 11 shows an embodiment where MN 1064 is aware of moving prior to moving from old foreign network 999 to new foreign network 1000 and requests a hand-off prior to moving. FIG. 11 shows three networks 998, 999, 1000. The old foreign network 999 includes an oFAAA 1045, an oSMM 1010, and a FA 1030. The new foreign network 1000 has an nFAAA 1050, a DHCPv6 server 1060, and an nSMM 1015. The home network 998 has a HAAA 1040, a HMM 1020, and a HA 1025.

On the old foreign network 999, the FA 1030 is connected to the oSMM 1010 by communication link 1031. The oSMM 1010 is connected to a central buss line 1077 by communication link 1011, and the oFAAA 1045 is connected to the central line buss 1077 by communication link 1012. The MN 1064 is connected to a transceiver 1060 by wireless link 1066, and the transceiver 1060 is connected to the oSMM 1010 by communication link 1059. Although a wireless link 1066 is shown, alternatively, MN 1064 could be connected to the oSMM 1010 by a wired communication link.

On the new foreign network 1000, the nSMM 1015 is connected to a central line buss 1071 by communication link 1017. The DHCPv6 1060 is connected to the central buss line by communication link 1019, and an nFAAA 1050 is connected to the central buss line 1071 by communication link 1021.

On the home network 998, the HAAA 1040 is coupled to a central buss line 1073 by communication link 1041. The HMM 1020 is connected to the central buss line 1073 by communication link 1023, and the HA 1025 is connected to the HMM 1020 by communication link 1027.

The three networks 998, 999, and 1000 are also connected to the Internet 1070. The old foreign network 999 is connected to the Internet 1070 by communication link 1081, which is coupled to the central buss line 1077. The new foreign network 1000 is connected to the Internet 1070 by communication link 1083, which is coupled to the central buss line 1071. The home network 998 is connected to the Internet 1070 by communication link 1082, which is coupled to the central buss line 1073. The MN 1064' connected to nSMM 1015 is the location the MN 1064 is moving to.

Figure 12:
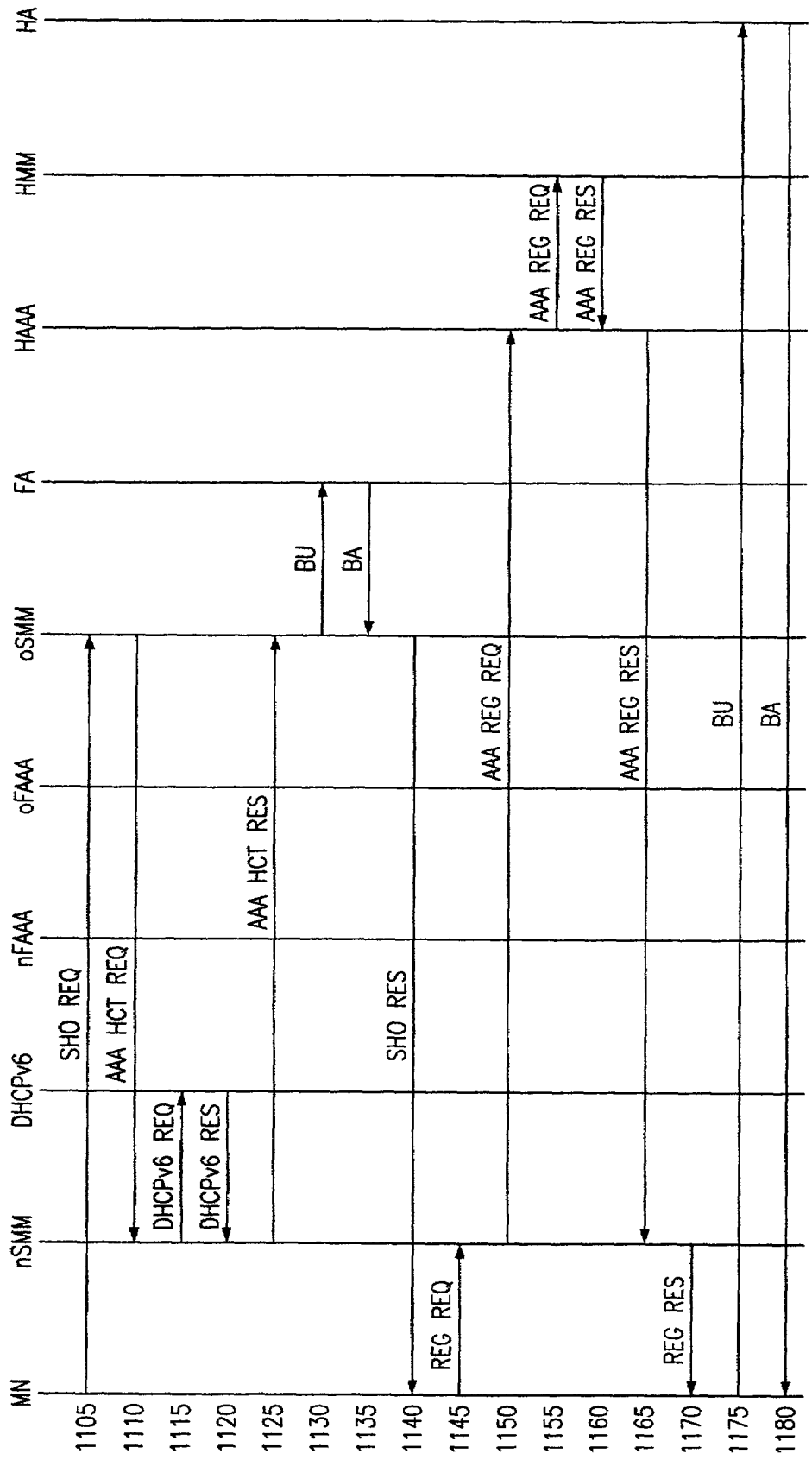
FIG. 12 is a message flow diagram for the Proactive Inter-Domain Hand-off of the mobile node in FIG. 11.

FIG. 12 shows the message flow for the embodiment where the MN 1064 lacks Layer-2 connectivity to a new foreign network 1000 it is aware it is moving to and performs a hand-off to move to the new foreign network 1000. This embodiment is referred to as a Proactive Inter-Domain Hand-off. The MN 1064 sends a System Hand-off Request message (SHO Req) 1105 to the oSMM 1010 when it detects that it is moving to new foreign network 1000. The format of the IP header for SHO Req 1105 is the same as shown in FIG. 1A. The oSMM 1010 sends an AAA Hand-off and Context Transfer Request message (AAA HCT Req) 1110 to the future nSMM 1015 via the oFAAA 1045 on the old foreign network 999 and nFAAA 1050. The nSMM 1015 transmits a DHCPv6 Req 1115 to the DHCPv6 1060 to obtain a new address to use as a care-of address. The DHCPv6 1060 allocates an EP address and sends a DHCPv6 Res 1120 back to the nSMM 1015 with a care-of address. The nSMM 1015 then generates and transmits an AAA Hand-off and Context Transfer Response message (AAA HCT Res) 1125 to the oSMM 1010 again via the nFAAA 1050 and oFAAA 1045 with the care-of address.

The oSMM 1010 allocates a FA 1030 to bi-cast data destined for the MN 1064 to both the old and new care-of address by transmitting a BU 1130, and the FA 1030 will transmit a BA 1135 back to the oSMM 1010. The oSMM 1010 will then send a System Hand-off Response message (SHO Res) 1140 back to the MN 1064 to confirm executing the hand-off and transmitting the co-located care-of address to the MN 1064.

When the MN 1064 receives the SHO Res 1140 from the oSMM 1010 and establishes Layer 2 connectivity to the new foreign network 1000, it will transmit a Reg Req 1145 to the nSMM 1015. The nSMM 1015 will then construct and transmit an AAA Registration Request message (AAA Reg Req) 1150 to the HAAA 1040 via nFAAA 1050. The HAAA 1040 will authenticate the MN 1064. If the MN 1064 authentication and authorization is affirmative, the request is forwarded to the HMM 1020 for further processing by an AAA Reg Req 1155.

The HMM 1020 updates the user state information, allocates HA 1025 to serve MN 1064, and constructs an AAA Registration Response message (AAA Reg Res) 1160 to transmit to the HAAA 1040 conveying the data. When the HAAA 1040 receives the Reg Res 1160, it in turn generates and transmits an AAA Reg Res 1165 to the nSMM 1015 via nFAAA 1050. The nSMM 1015 then sends a Reg Res 1170 to the MN 1064 conveying the information. Once the MN 1064 receives a Reg Res 1170, it proceeds to complete registration by sending a BU 1175 containing the care-of address to the HA 1025, which acknowledges with a BA 1180.

As a further alternative embodiment in each of these embodiments the mobility managers (SMM 10, HMM 40, nSMM 210, oSMM 212, HMM 240, nSMM 410, oSMM 412, HMM 440, nSMM 610, HMM 640, oSMM 810, nSMM 815, HMM 820, oSMM 1010, nSMM 1015, and HMM 1020) may maintain a pool of addresses to allocate as care-of addresses to mobile nodes. If there is a pool of addresses to allocate, then the DHCPv6 Request messages (110, 310, 615, 710, 910 and 1115) and the DHCPv6 Response message (115, 315, 620, 715, 915, and 1120) are eliminated. In place of these messages (110, 115, 310, 315, 615, 620, 710, 715, 910, 915, 1115, and 1120) the SMM 10, nSMM 210, nSMM 410, nSMM 610, nSMM 815, and nSMM 1015 will periodically request a new pool of addresses from the DHCPv6 server to allocate as care-of addresses.

While the invention has been particularly shown and described with respect to preferred embodiments, it will be readily understood that minor changes in the details of the invention may be made without departing from the spirit of the invention.

We claim:

1. A method for registration of a mobile node on a packet-based communication network comprising the steps of:

requesting a care-off address for a mobile node by transmitting a request message to a first node on a first network, said first node capable of assigning a unique care-of addresses to each of a plurality of mobile nodes connecting to said first network;

receiving a care-of address for said mobile node at a home network under a first circumstance from the first network, wherein said care-of address is an expanded address identifying the network address location for said mobile node on the first network, and said care-of address is included in an information packet that comprises a source address data field containing the expanded address for the source node transmitting data in the information packet, a destination address data field containing the expanded address for the intended destination node ultimately receiving the data, and a payload data field containing the data transmitted from the source node to the destination node;

routing a message acknowledging receiving said care-of address to said first network;

allocating a node on the home network to forward information packets to the mobile node at the care-of address using a binding message transmitted on the first network to said node on the home network; and updating a plurality of nodes with the mobile node registration address on the home network with said care-of address.

2. The method of registration of a mobile node on a packet-based communication network of claim 1, further comprising the step of requesting said care-of address from a serving mobility manager on the first network.

3. The method for registration of a mobile node on a packet-based communication network of claim 2 further comprising the step of allocating said mobile node care-of address on the first network after said request step.

4. The method for registration of a mobile node on a packet-based communication network of claim 3 wherein the care-of address is transmitted through the serving mobility manager on the first network to said home network.

5. The method for registration of a mobile node on a packet-based communication network of claim 3 wherein the care-of address is obtained from a pool of expanded addresses provided to said serving mobility manager on the first network.

6. The method for registration of a mobile node on a packet-based communication network of claim 2 wherein said first network is a foreign network and said first circumstance is a power-up performed by said mobile node on said foreign network.

7. The method for registration of a mobile node on a packet-based communication network of claim 2 wherein said first network is a foreign sub-network located on said home network and said first circumstance is a power-up performed by said mobile node on said foreign sub-network.

8. The method for registration of a mobile node on a packet-based communication network of claim 1 wherein the care-of address is allocated by a server computer on said first network.

9. A method of performing a mobile node hand-off on a packet-based communication network, comprising the steps of:
   responding at a second network to a request for said mobile hand-off from a first network, said response including allocating a care-of address, said care-of address having an expanded address capable of identifying the network address location for the mobile node on the first network, and said care-of address is included in an information packet that comprises a source address data field containing the expanded address for the source node transmitting data in the information packet, a destination address data field containing the expanded address for the intended destination node ultimately receiving the data, and a payload data field containing the data transmitted from the source node to the destination node;
   transmitting said care-of address from a serving mobility manager on said first network to the mobile node, said serving mobility manager functioning to request said care-of address from a first node on the first network capable of allocating a unique care-of address;
   allocating a router on the home network to route information packets to said mobile node at the care-of address using a binding message; and
   updating the care-of address for the mobile node on a plurality of nodes on the first network and the home network.

10. The method of performing a mobile node hand-off on a packet-based communication network of claim 9 wherein the first node comprises a computer server.

11. The method of performing a mobile node hand-off on a packet-based communication network of claim 9 wherein the first network is a first foreign sub-network on a home network.

12. The method of performing a mobile node hand-off on a packet-based communication network of claim 10 wherein the second network is a second foreign sub-network on a home network.

13. The method of performing a mobile node hand-off on a packet-based communication network of claim 9 wherein the first network is a first foreign network.

14. The method of performing a mobile node hand-off on a packet-based communication network of claim 13 wherein the second network is a second foreign network.

15. The method of performing a mobile node hand-off on a packet-based communication network of claim 9 further comprising the step of moving the mobile node to said second network after requesting said mobile node hand-off.

16. The method of performing a mobile node hand-off on a packet-based communication network of claim 9 further comprising the step of moving the mobile node to said second network before requesting said mobile node hand-off.

17. A method of registering a mobile node on a packet-based communication network comprising the steps of:
   transmitting a request message from said mobile node to a first router that initiates assigning a care-of address, said mobile node registering on a first network;
   receiving a request from said first router at a server computer storing care-of addresses for allocating to registering mobile nodes on the first network;
   allocating the care-of address from said server computer, said care-of address having an expanded address for identifying a network address location of said mobile node or other nodes, and said care-of address included in an information packet transmitted over said first network comprising a source address data field containing the expanded address for the source node transmitting data in the information packet, a destination address data field containing the expanded address for the intended destination node ultimately receiving the data, and a payload data field containing the data transmitted from the source node to the destination node;
   transmitting said care-of address to a serving mobility manager on a second network, said serving mobility manager allocating a router on the second network to provide routing and other services to the mobile node; and
   transmitting said care-of address to said allocated router and responding with a response message to said mobile node indicating registering is complete.

18. The method for registering a mobile node on a packet-based communication network of claim 17 wherein the mobile node moves to the second network after the transmission of the request message.

19. The method of registering a mobile node on a packet-based communication network of claim 17 wherein the mobile node moves to the second network before the transmission of the request message.

20. The method for registering a mobile node on a packet-based communication network of claim 17 wherein the care-of address is transmitted through an AAA server computer on said first network.

* * * * *